US006102472A

United States Patent [19]

Wallström

[11] Patent Number: 6,102,472

[45] Date of Patent: Aug. 15, 2000

[54] VEHICLE BODY COMPRISING A LOWER BODY PART AND AN UPPER BODY PART, AS WELL AS A METHOD OF MANUFACTURING AN UPPER BODY PART FOR SUCH VEHICLE BODY

[75] Inventor: Ingemar Wallström, Göteborg, Sweden

[73] Assignee: AB Volvo, Göteborg, Sweden

[21] Appl. No.: 09/125,819

[22] PCT Filed: Feb. 24, 1997

[86] PCT No.: PCT/SE97/00305

§ 371 Date: Sep. 9, 1998

§ 102(e) Date: Sep. 9, 1998

[87] PCT Pub. No.: WO97/30882

PCT Pub. Date: Aug. 28, 1997

[30] Foreign Application Priority Data

Feb. 26, 1996 [SE] Sweden ................................ 9600721

[51] Int. Cl.[7] ................................ B60J 7/50

[52] U.S. Cl. ................................ 296/203.01; 296/203.03; 296/205

[58] Field of Search ................................ 296/203.01–203.04, 296/205, 216.07, 216.09, 210, 204, 220.01

[56] References Cited

U.S. PATENT DOCUMENTS

| | | | |
|---|---|---|---|
| 2,157,649 | 5/1939 | Eksergian | 296/203.01 |
| 2,389,907 | 11/1945 | Helmuth | 296/203.01 |
| 2,627,426 | 2/1953 | Toncray et al. | 296/203.01 |
| 2,627,437 | 2/1953 | Toncray et al. | 296/203.01 |
| 2,669,462 | 2/1954 | Toncry et al. | 296/203.01 |
| 3,292,969 | 12/1966 | Eggrt | 296/205 |
| 3,994,525 | 11/1976 | Breitschwerdt et al. | 296/220.01 |
| 4,355,844 | 10/1982 | Funtini Muzzarelli | 296/205 |
| 4,428,599 | 1/1984 | Jahnle | 296/203.01 |
| 4,440,434 | 4/1984 | Celli | 296/205 |
| 4,508,150 | 4/1985 | Granryd | 152/169 |
| 4,660,345 | 4/1987 | Browing | 296/205 |
| 4,759,489 | 7/1988 | Pigott | 228/102 |
| 5,054,843 | 10/1991 | Gray | 296/204 |
| 5,092,649 | 3/1992 | Wurl | 296/203.01 |
| 5,096,254 | 3/1992 | Sparke | 296/203.03 |
| 5,139,006 | 8/1992 | Trudeau | 125/12 |
| 5,213,386 | 5/1993 | Janotik et al. | 296/203.01 |
| 5,458,393 | 10/1995 | Benedyk | 296/205 |
| 5,480,208 | 1/1996 | Cobes et al. | 296/203.03 |
| 5,720,511 | 2/1998 | Benedyk | 296/203.01 |
| 5,839,777 | 11/1998 | Vlahovic | 296/205 |
| 5,855,394 | 1/1999 | Horton et al. | 296/204 |
| 5,882,064 | 3/1999 | Emmons | 296/203.01 |

FOREIGN PATENT DOCUMENTS

| | | |
|---|---|---|
| 618 374 | 1/1990 | Australia . |
| 0 250 678 | 1/1988 | European Pat. Off. . |
| 32 04 526 | 8/1983 | Germany . |
| 40 18 592 | 12/1991 | Germany . |
| 42 14 557 | 2/1994 | Germany . |
| 42 34 463 | 4/1994 | Germany . |
| 4-116138 | 4/1992 | Japan . |

*Primary Examiner*—Joseph D. Pape
*Assistant Examiner*—Kiran Patel
*Attorney, Agent, or Firm*—Royston, Rayzor, Vickery, Novak & Druce, L.L.P.

[57] ABSTRACT

A private care body with a front part, rear part, floor pan and body sides and a roof part includes a body lower part and a body superstructure with a beam structure welded fast on top of it; the beam structure includes a thin-walled, flange-free profile parts with closed cross sections made by roll-forming and welded together to each other with the component parts of the beam structure being hardened so that the material in the constituent profile parts has a yield limit of the order of 900–1000 N/mm$^2$.

20 Claims, 4 Drawing Sheets

P1-P2
6
76
60C
60B
74
60
64
58
72
62C
60A
54
8
14
56
4
70
62B
66
62
68
62A
P1-P2

VEHICLE BODY COMPRISING A LOWER BODY PART AND AN UPPER BODY PART, AS WELL AS A METHOD OF MANUFACTURING AN UPPER BODY PART FOR SUCH VEHICLE BODY

BACKGROUND OF THE INVENTION

The present invention relates to a vehicle body, especially for private cars, including a front part and a rear part joined together via a floor pan and body sides with openings for doors, and a roof part which via hollow pillars is structurally connected to the front and rear parts respectively the body sides, which body is composed of two main structural body parts joined to each other in the region of an imaginary dividing surface level with or under the glass lower edges of window openings in the body, where the main body part under the dividing surface is a body lower part comprising the floor pan, front and rear parts and body side lower parts.

The invention also relates to a method of manufacturing a light, complete body superstructure for a vehicle body of the above mentioned type.

DESCRIPTION OF THE RELATED ART

A body of this type is known from JP 61-92965. The body superstructure in this case comprises A- and C-pillars, the constructural design of which, however, is not described.

DE 4018592 also concerns a vehicle body comprised of a lower part and a super-structure where the beam structure of the superstructure comprises conventional, hollow beam profiles of extruded aluminium.

AU B 37074/89 describes a vehicle body where the beam construction of the super-structure comprises conventional, hollow beam profiles consisting of sheet metal profiles with welded-together flange parts.

It is important in vehicles with self-supporting bodies that the engine-gearbox, power transmission and wheel suspensions are fastened to beams and/or stiffeners in the body. A self-supporting body is usually manufactured from pressed steel plates (in the main mild pressing steel) which are joined together by means of spot welding In this case the normal thickness of the sheet is 0.7–2.5 mm. After welding together the body is anti-rust treated and then painted.

Environmental thinking has meant for the car industry, amongst others, more effective exhaust cleaning and reduced exhaust quantities. Sharper emission requirements and increased fuel prices are driving the work of reducing the fuel consumption of cars in different ways. This can take place by producing engines with improved fuel economy and by means of new constructional solutions, which means that the weight of the cars can be lower and which, in practice, means new body constructions with lower weights. The lower weight must, however, be combined with the requirements for improved collision safety (which corresponds to a sharper requirement for dimensionally stable cabin space), and the new body constructions which developments are now forcing through must also be both lighter and stronger than the body types used up to now.

SUMMARY OF THE INVENTION

A main object of the present invention is therefore to produce a new and lighter type of vehicle body, which furthermore offers a more flexible way of building in that the body is formed of a body lower part and a body superstructure with a beam structure which gives the required weight reduction but at the same time contributes to an increased body strength and stiffness.

The basic idea of the invention in this respect is to use strengthwise more effective sections and materials, and thereby lighter construction elements, in the beam structure of the body superstructure.

Materially this will take place through the use of high tensile steel or steel alloys with considerably higher strength than conventional steel sheet metal which is generally used for pressed body parts respectively sheet metal which is used for the manufacture of e.g. spot-welded sheet metal flanged beams. The above mentioned object is achieved in a vehicle body of the type given in the introduction through the body having the features stated in the characterizing part of claim 1. A distinguishing feature is in this case that the main body part lying above the dividing surface is a body superstructure with a beam structure comprising thin-walled profile parts formed through rolling and joined together through welding, which have closed cross-sections completely without flanges and consist of boron steel or similar high tensile steel capable of being hardened, which is hardened before or after the welding together to form the beam structure and which after hardening has a yield point which is at least 900 to 1100 N/mm$^2$ and which by reason of that is 2–3 times hither than for normal high tensile steel, respectively 4–5 times higher than for pressing steel normally used in body manufacturing.

The yield point values for the high tensile steel mentioned can be compared with the yield points for mild pressing steel, e.g. 150–180 N/mm$^2$ respectively for special steel (such as HSS-steel) for certain beams. e.g. 280–350 N/mm$^2$.

Amongst the advantages of a body superstructure with a beam structure according to the invention, the following can be mentioned:

- The reduced weight of the body superstructure leads to a lower centre of gravity for the complete body and therewith the car.
- By making e.g. the A-, B-, C-pillars as profiled parts according to the invention, the pillars can be made considerably thinner without their strength being impaired.
- The body superstructure can be produced as relatively complete units before it is placed above and welded to, or in some other way attached (e.g. through bolting or riveting) to, the body lower part.
- By forming the body from the body lower part and the body superstructure, the requirement for conventional, large body whole sides comprising both body side lower part and the body side superstructure is avoided. This means simpler pressing requirements which leads to less cost-demanding press tools and improved material use during the manufacturing of the body sides. The doors can furthermore be manufactured without door frames and the flexibility is increased for the manufacturing of both the door sides and the body sides.
- The strong beam structure of the body superstructure forms together with the body lower part a “safety case” around the cabin space.
- The beam structure in the body superstructure means that not only frontal collision loads but rear collision loads and side collision loads can be led via the body superstructure, the ability of which to receive and withstand e.g. impacts with elk and roof collapsing loads (during roll overs) is considerably improved.

By forming the beams and pillars in the body as thin-walled, flange-free profile parts, the space demanding and weight-increasing weld finales which are found on conventional beams and pillars, which are formed of one or more joined-together steel plate profiles of pressing steel with preferably spot-welded longitudinal flange joints, are avoided.

The profile parts in the beam structure of the body superstructure are preferably manufactured by roll-forming of boron steel bands. In this way a constant closed cross-section is achieved by continuous welding, seaming etc in the roll-forming process. Hollow profile parts with varying cross-sections and/or bending alone their length can, for example, be manufactured by so-called hydroforming. The hardening of the profile parts (in order to achieve the desired yield point) takes place after the production of the actual profile shape. The hardening of the respective profile part takes place first after the profile part, e.g. by bending or in some other way, is brought into the desired configuration or, in other words, the desired final total shape in the complete longitudinal extent of the profile part. The profile part is hardened so that that the yield point of the material achieves a value greater than 900 N $mm^2$. Further characteristics of a vehicle body according to the present invention are given in the dependent claims 2 to 10 and in claims 11 and 12 is stated a method of manufacturing a light, complete body superstructure for a vehicle body according to claim 1.

In another embodiment the profile parts which are to be comprised in the vehicle superstructure are first welded to form the intended beam structure and only afterwards undergo the required hardening.

BRIEF DESCRIPTION OF THE DRAWINGS

The invention will now be described more closely with reference to the embodiments shown on the accompanying drawings, where.

DESCRIPTION OF THE PREFERRED EMBODIMENTS

Figure 1:
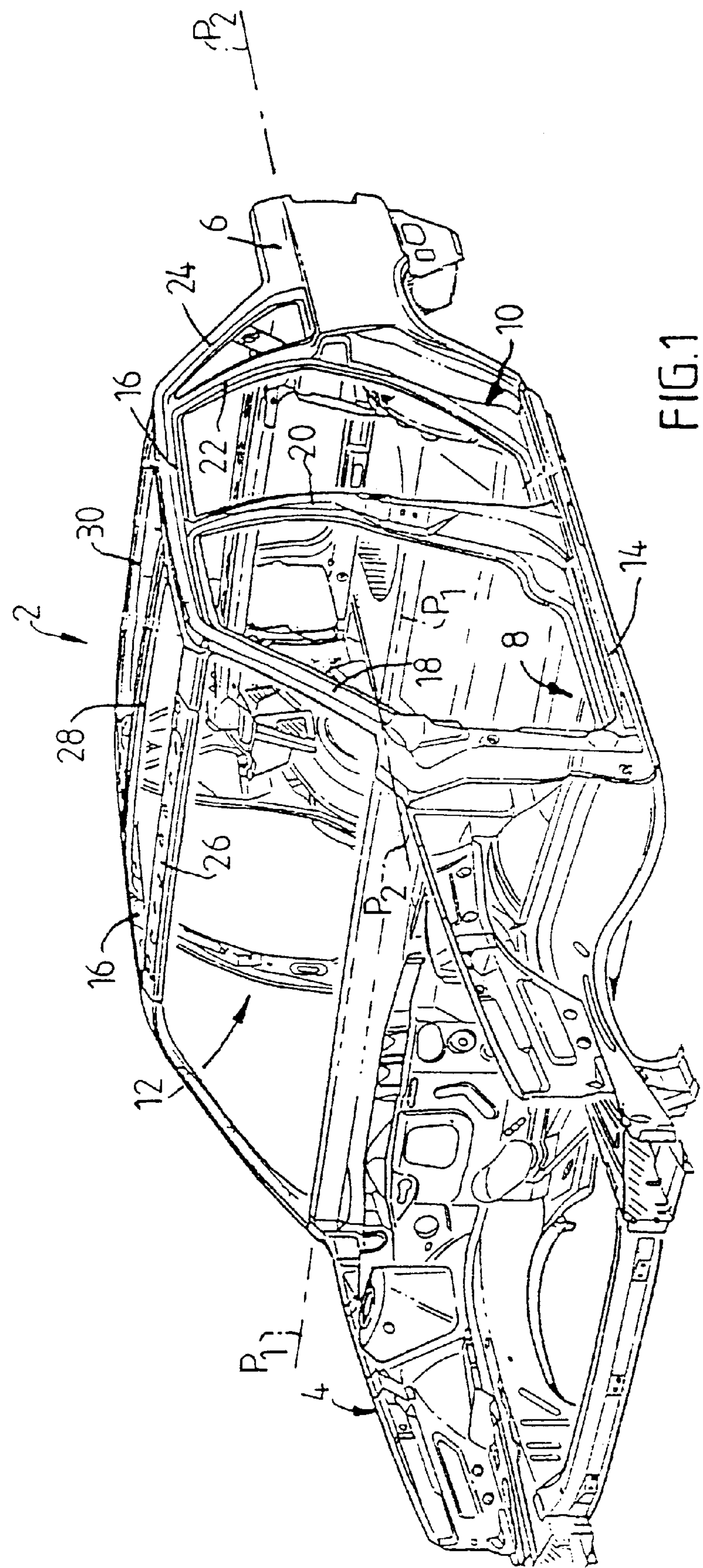
FIG. 1 shows in perspective a conventional self-supporting private car body.

FIG. 1 shows a body 2 for a private car of known type. The body, which is shown without doors, comprises a front part 4 and a rear part 6 formed as deformation zones intended to take up a large part of the impact energy during collisions. The front and rear parts are mutually joined via a floor pan 8 and body whole sides 10,12. The body whole sides, which consist of welded together large pressed steel plates with openings for the vehicle doors, extend in the vertical direction from respective body 14 up to the related roof 16. In this case the body whole sides 10,12 comprise A-, B-, C- and D-pillars 18, S20, 22 and 24. These pillars are formed of joined-together press steel pillar sections. FIG. 1 has a pair of mutually perpendicular dividing lines $P_1$ and $P_2$ which are intended to show the position of an imaginary dividing surface $P_1$–$P_2$ level with the lower glass edges of the window openings in the body 2 and its (here not shown) doors. The roof sills 16 are connected to each other by means of cross beams 26, 28 and 30 and a (here not shown) roof panel.

Figure 2:
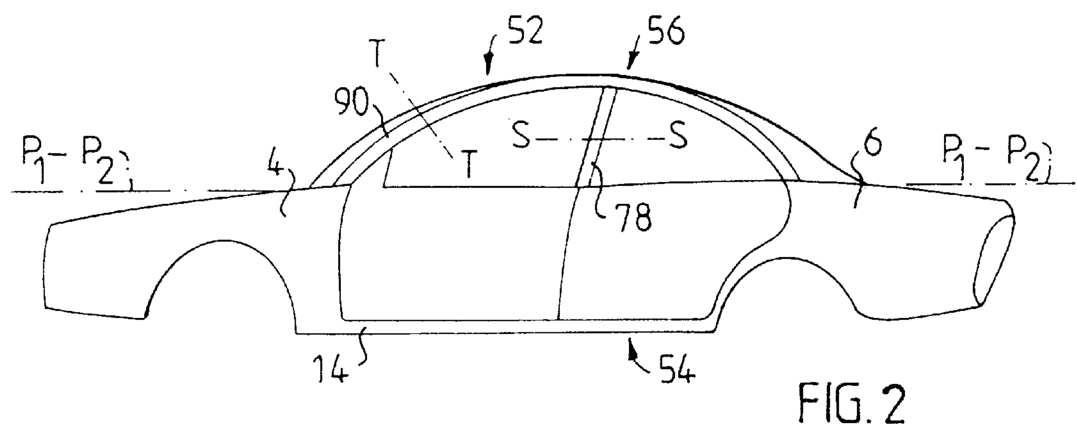
FIG. 2 shows schematically a side view of a private car body according to the invention.

Reference will now be made to FIG. 2 which shows schematically a private car body 52 equipped with doors, according to the present invention. In this case the body 52 is imagined as being comprised of two structural main body parts which are joined to each other in the region of the imaginary dividing surface $P_1$–$P_2$ shown in FIG.

1–2. One main body part which is situated under the dividing surface $P_1$–$P_2$. is a body lower part 54 which comprises a floor pan (corresponding to floor pan 8 in FIG. 1), front and rear parts 4.6 and body side lower parts which extend from the respective body sill 14 up to the dividing surface $P_1$–$P_2$. The other body main part, which is situated above the dividing surface $P_1$–$P_2$, is a body superstructure 56 which is the part of the body 52 which comprises the new and distinguishing features of the invention.

Figure 3:
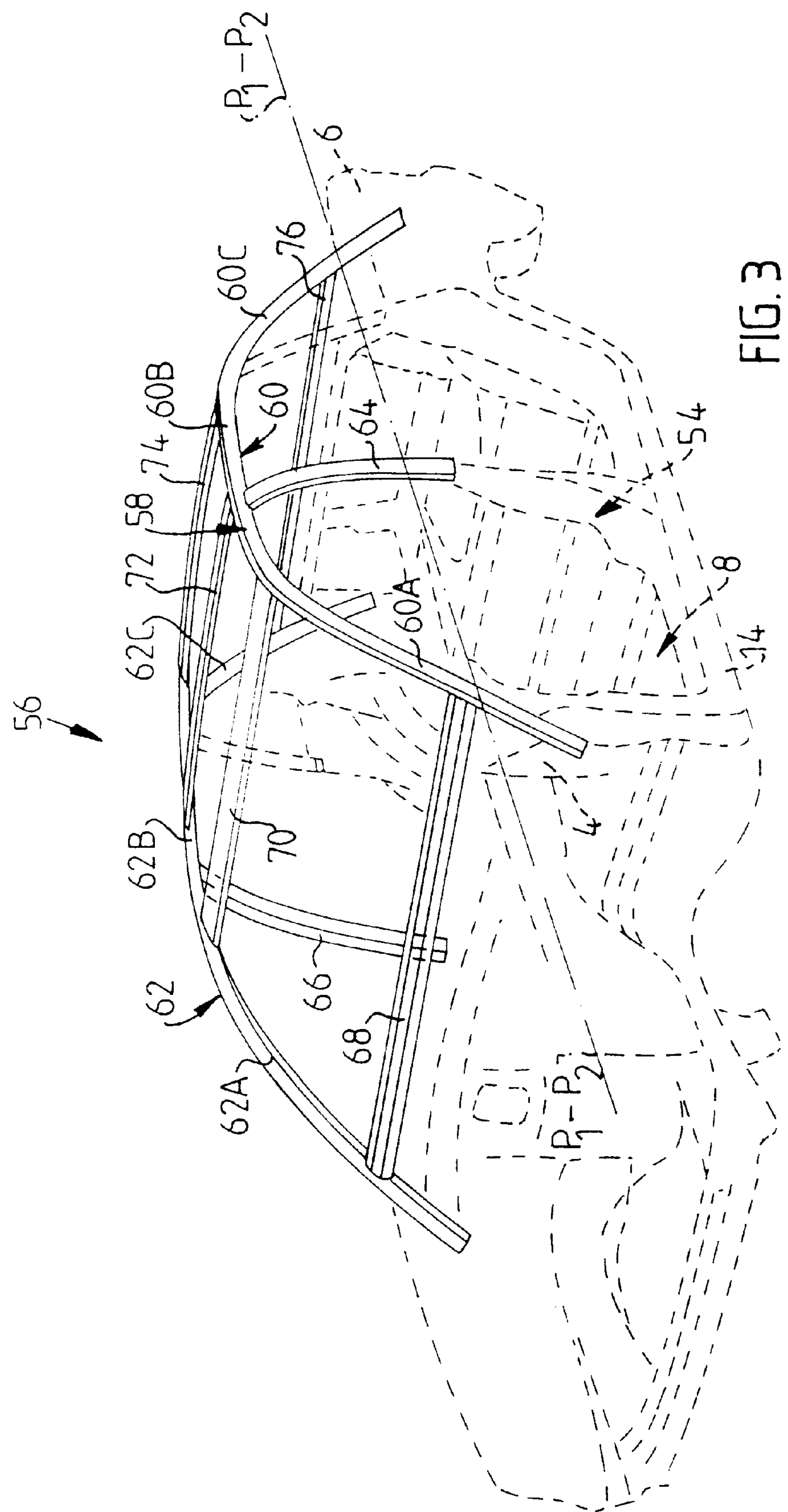
FIG. 3 shows in perspective the beam structure of the body superstructure in a body according to the invention.

For the continued description of the body superstructure 56 reference is now made to FIG. 3, where it can be seen that the body superstructure has a beam structure 58 comprising welded-together hollow profile parts with closed cross-sections. These profile parts are thin-walled and have no external or internal welding flanges. The material of which the profile parts are made is a high tensile steel, preferably boron steel. The profile parts are manufactured through so-called roll-forming of a band of boron steel, which is also weldable after hardening. By means of hardening it is possible to raise the yield limit for the material in the profile parts to at least 900 to 1100 $N/mr^2$. preferable 1050 $N/mm^2$.

The beam structure 58 shown in FIG. 3 comprises two curved bent hollow profile parts 60 and 62 arranged at the longitudinal side edges of the body superstructure 56. For each of these two profile parts 60, 62 their front part seen in the longitudinal direction of the body,- forms one A-pillar 60A resp. 62A which at the lower end is welded fast to the front part 4 of the body lower part 54. At their rear part the profile parts 60 resp. 62 form a C-pillar 60C resp. 62C, which at the lower end is welded fast to the rear part 6 of the body lower part. At their central upper part each profile part 60 resp. 62 forms the roof sill 60B resp. 62B, to which the upper ends of the B-pillars 64 and 66 of the beam structure 58 are welded fast.

The beam structure 58 of the body superstructure further comprises a suitable number, preferably 3–5, of pieces of thin-walled, flange-free profile parts of the same general type as the profile parts 60 and 62 resp. the B-pillars 64 and 66, fixed between the profile parts 60 and 62. These cross beams, which in FIG. 3 number five, are designated 68, 70, 72, 74 and 76 and are accordingly also manufactured from boron steel.

According to an alternative embodiment the cross beams 68, 70. 74, 76 can be made of open profile parts which have a profiled cross-section.

The cross beams 68 and 70 are so placed in the beam structure 58 that they lie at the horizontal lower and upper edges of the opening for the windscreen of the vehicle.

The cross beams 74 and 76 in their turn are situated by the upper and lower edges of the opening intended for the rear screen of the vehicle in the body superstructure 58. All of these cross beams 68, 70, 74, 76 are shaped with contact surfaces for the front resp. rear screen. The cross beam 72 at the middle of the body superstructure 58 is situated in approximately the same vertical transverse plane to the body superstructure as that in which the B-pillars 64 and 66 extend. The parts 60, 62, the pillars 64, 66 and the beams 68–76, which together are to form the beam structure 58, are all separately hardened, preferably before they are welded together. Alternately it is, however, possible that the profile parts 60, 62, the B-pillars 64, 66 and the cross beams 68, 70, 72, 74 and 76 are welded together to the beam structure 58 before it is subjected to the hardening process which increases the yield point of the comprised material, i.e. in this case the boron steel, to the desired value, as e.ga. 1050 N/mm$^2$.

The roof sills 60*b*, 62B of the body and the cross beam which are situated at the upper parts of the front resp, rear screen, are provided with contact surfaces for a roof panel of a suitable material, e.g. sheet metal, aluminium or plastic, which is welded or glued onto the body. The roof panel can also form a complete roof with a sunroof.

Vehicle door which do not have door arches can be used with a body superstructure 56 and beam structure 58 according to FIG. 3.

Figure 5:
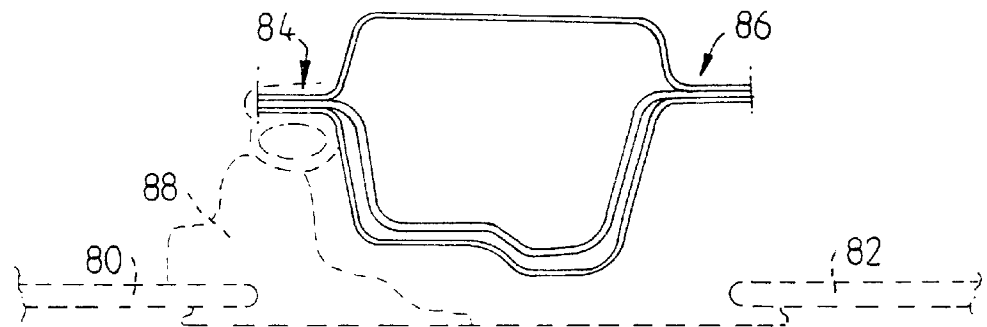
FIG. 5 shows a cross-section through a conventional spot-welded sheet metal flange pillar corresponding to the pillar shown in FIG. 4.
Figure 4:
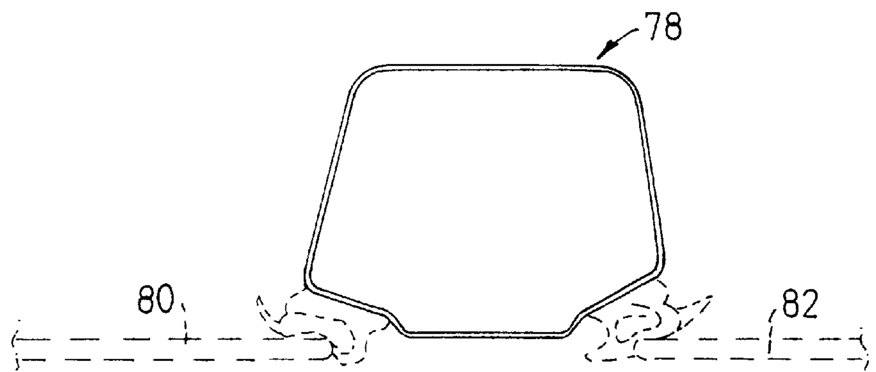
FIG. 4 shows a cross-section through a B-pillar for a body according to the invention.
Figure 6:
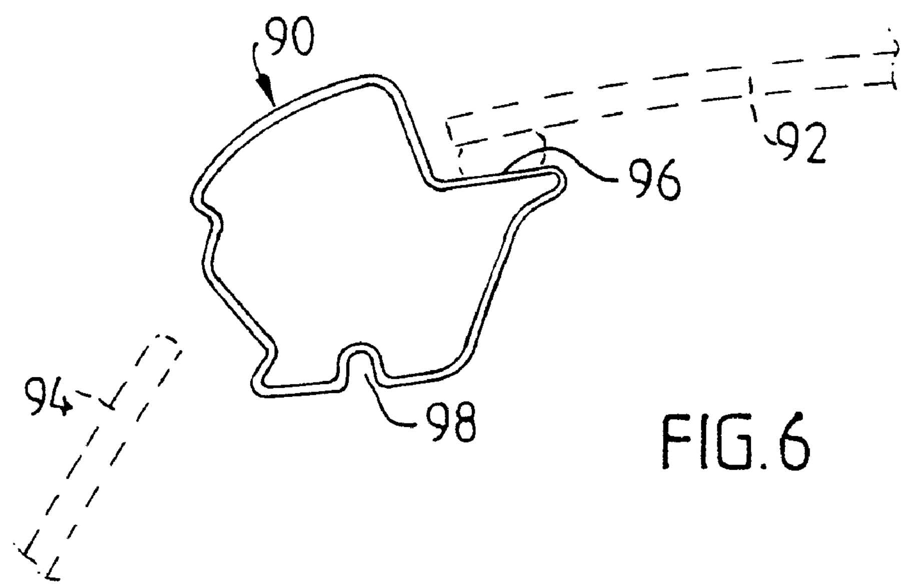
FIG. 6 shows a cross-section through an A-pillar of the body shown in FIG. 2.

FIG. 4 shows an example of the cross-section shape (at S—S) of a B-pillar 78 in a body (see FIG. 2) according to the invention. The front and rear door screen which are in contact with the pillar 78 have the reference numerals 80 resp, 82. The pillar 78 which for example, has could have been given its special cross-section profile shape by means of so-called hydroforming, forms, as can be seen, a seemless, thin-walled profile part which completely lacks the the space-stealing welded-together sheet metal element flanges. As a comparison, reference is made to FIG. 5 which shows a conventional hollow beam made of three sheet metal elements which are welded together at the flange regions 84 and 86. The screen 80 in this case is part of a door with a doorframe 88. FIG. 6 shows a cross-section (at T—T in FIG. 2) through an A-pillar 90 in the body according to FIG. 2. The windscreen and the screen in the front door are shown dashed and have reference numbers 92 resp, 94. The pillar 90 has a contact surface 96 for the windscreen 92 and a groove 98, which can be used as a cable channel.

Figure 7:
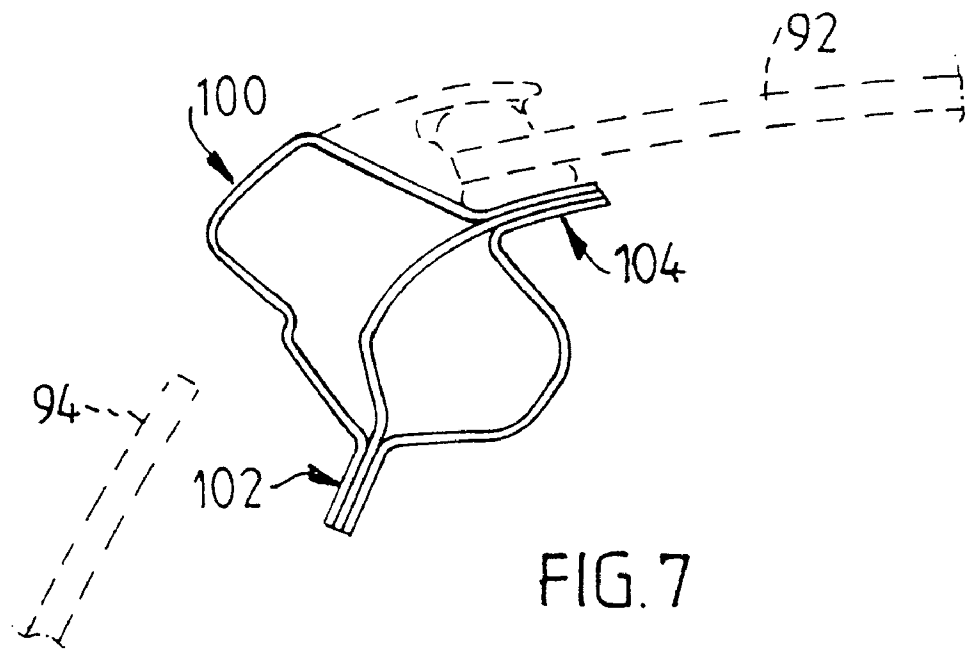
FIG. 7 shows a corresponding cross-section through a conventional A-pillar of the spot-welded sheet metal flange type.

FIG. 7 shows (in the same way as FIG. 6) a cross-section through an A-pillar which, however, in this case is a conventional pillar 100, which is made up of three pieces of profiled sheet metal elements with longitudinal flange parts joined together at the flange regions 102 and 104.

What is claimed is:

1. Vehicle body (52) comprising:

a front part (4) and a rear part (6) mutually connected via a floor pan (8) and body sides (10,12) with openings for doors, and a roof part which via hollow pillars is structurally connected to the front and rear parts (4,6) of the body sides (10,12), which body is comprised of two main structural body parts connected to each other in the region of an imaginary dividing surface ($P_1$–$P_2$) level with or under the lower glass edges of the window openings in the body, where the main body parts situated under the dividing surface is a body lower part (54) comprising the floor pan (8), front and rear parts (4,6) and body side lower parts, wherein the main body part situated above the dividing surface is a body superstructure (56) with a beam structure (58) comprising roll-formed, thin-walled profile parts (60–76) joined together by welds, which profile parts have closed, flangeless cross-sections and are made of a hardened tensile steel and which hardened tensile steel has a yield point which is at least 900 N/mm$^2$.

2. Vehicle body (52) comprising:

a front part (4) and a rear part (6) mutually connected via a floor pan (8) and body sides (10,12) with openings for doors, and a roof part which via hollow pillars is structurally connected to the front and rear parts (4,6) of the body sides (10,12), which body is comprised of two main structural body parts connected to each other in the region of an imaginary dividing surface ($P_1$–$P_2$) level with or under the lower glass edges of the window openings in the body, where the main body parts situated under the dividing surface is a body lower part (54) comprising the floor pan (8), front and rear parts (4,6) and body side lower parts, wherein the main body part situated above the dividing surface is a body superstructure (56) with a beam structure (58) comprising roll-formed, thin-walled profile parts (60–76) Joined together by welds, which profile parts have closed, flangeless cross-sections and are made of a hardened tensile steel and which hardened tensile steel has a yield point which is at least 900 N/mm$^2$, and wherein the yield point of said beam structure is 2–3 times higher than a yield point of a comparative beam structure the same as said beam structure but comprising non-hardened high tensile steel.

3. Vehicle body according to claim 2, wherein at least one of said profile parts (60,76), which are to be connected to the body lower part (54), have been made into their final shape with varying cross-sections or bending along their length through complementary forming.

4. Vehicle body according to claim 2, characterized in that the beam structure (58) of the body superstructure comprises thin-walled, flange-free, closed cross-sectioned profile parts (60, 62) bent or shaped to the desired body shape, along the longitudinal side edges of the body superstructure (56).

5. Vehicle body according to claim 4, characterized in that the bent profile parts (60, 62) on the longitudinal side edges of the body superstructure (56) each form at their front end, seen in the longitudinal direction of the body, an A-pillar (60A, 62A), which at the bottom is attached fast to the front part (4) of the body lower part (54), and at its rear end a C-pillar (60C, 62C), which at the bottom is attached fast to the rear part (6) of the body lower part.

6. Vehicle body according to claim 4, wherein the beam structure (58) of the body superstructure further comprises cross beams (68–76) in the shape of thin-walled, flange-free, closed cross-sectional profiled parts, which extend transversely between the curved bent profile parts (60,62) at the longitudinal side edges of the body superstructure, and which have their ends welded fast to these two profile parts (60,62).

7. Vehicle body according to claim 4, wherein the beam structure (58) of the body superstructure further comprises cross beams (68–76) in the shape of thin-walled, profiled parts having an open cross-section which extends transversely between the curved bent profile parts (60–62) at the longitudinal side edges of the body superstructure and which have their ends welded fast to these two profile parts (60,62).

8. Vehicle body according to claim 6, wherein the cross beams comprise transverse profile parts (68,70,74,76) arranged at least at the horizontal lower and upper edges of the openings intended for the front respective rear screens in the body superstructure (56), wherein the profiles are shaped with contact surfaces (96) for the front respective rear screen.

9. Vehicle body according to claim 2, wherein at least one of the constituent profile parts is shaped with a longitudinal groove (98) on the outside of the wall of the profile part, which groove forms a longitudinal stiffener in the wall.

10. Vehicle body according to claim 6, wherein the roof sill (60B,62B) of the body and the cross beams which are situated at the upper parts of the windscreen respective rear screen have contact surfaces for a roof panel.

11. Vehicle body according to claim 2, wherein the body superstructure (56) constitutes a light, complete, pre-assembled unit the structure (58) of which is made up of a number of beams in the shape of closed profiles which define its outer contours and roof, wherein the profiles being placed in connection to openings for glass panels in the vehicle body, and the outer delimiting surfaces of the roof are provided with contact surfaces for glass panels respective roof panels, in order to facilitate the mounting and/or attachment of these units.

12. Vehicle body according to claim 11, characterized in that the body superstructure (56) is provided with, on the one hand, roof panels which may comprise a sunroof, on the other hand, glass panels, inner trim and other complementary equipment, whereby the body superstructure as a complete, pre-assembled, finished unit is mounted on the body lower part (54), which together with the superstructure forms the body of the vehicle.

13. The vehicle body of claim 2, wherein said high tensile steel comprises boron steel.

14. Vehicle body according to claim 2, wherein the profile parts (60–76) in the beam structure (58) of the body superstructure are formed through roll-forming of profile parts made from boron steel bands which, after they have been brought into a desired final configuration are subsequently brought to a hardened condition where they have a yield point of the order of 1050 N/mm$^2$.

15. The vehicle body of claim 2, wherein the hardened tensile steel has a yield point in the range of 900–1100 N/mm$^2$.

16. The vehicle body of claim 3, wherein said one of said profile parts (60, 76), which are to be connected to the body lower part (54), have been made into their final shape with varying cross-sections or bending alone their length through hydroforming.

17. The vehicle body of claim 9, wherein said groove forms a cable channel.

18. The vehicle body of claim 1, wherein the hardened tensile steel has a yield point in the range of 900–1100 N/mm$^2$.

19. Vehicle body (52) comprising:

a front Part (4) and a rear part (6) mutually connected via a floor pan (8) and body sides (10,12) with openings for doors, and a roof part which via hollow pillars is structurally connected to the front and rear parts (4,6) of the body sides (10,12), which body is comprised of two main structural body parts connected to each other in the region of an imaginary dividing surface ($P_1$–$P_2$) level with or under the lower glass edges of the window openings in the body, where the main body parts situated under the dividing surface is a body lower part (54) comprising the floor pan (8), front and rear parts (4,6) and body side lower parts, wherein the main body part situated above the dividing surface is a body superstructure (56) with a beam structure (58) comprising roll-formed, thin-walled profile parts (60–76) joined together by welds, which profile parts have closed, flangeless cross-sections and are made of a hardened tensile steel and which hardened tensile steel has a yield point which is at least 900 N/mm$^2$, and wherein the yield point of said beam structure is 4–5 times higher than a yield point of a comparative beam structure the same as said beam structure comprising non-hardened press steel.

20. The vehicle body of claim 19, wherein the hardened tensile steel has a yield point in the range of 900–1100 N/mm$^2$.

* * * * *